United States Patent

Nakamura et al.

[11] Patent Number: 5,239,566
[45] Date of Patent: Aug. 24, 1993

[54] MULTI-LAYERED MIRROR

[75] Inventors: Hiroshi Nakamura, Tokyo;
Katsuhiko Murakami, Kawasaki;
Hiroshi Nagata, Tokyo, all of Japan

[73] Assignee: Nikon Corporation, Tokyo, Japan

[21] Appl. No.: 911,493

[22] Filed: Jul. 10, 1992

[30] Foreign Application Priority Data

Aug. 9, 1991 [JP] Japan .................................. 3-199711

[51] Int. Cl.[5] .............................................. G21K 1/06
[52] U.S. Cl. ......................................... 378/43; 378/84; 378/76; 359/586
[58] Field of Search ....................... 378/43, 70, 71, 76, 378/84; 359/586–589

[56] References Cited

U.S. PATENT DOCUMENTS

| 4,684,565 | 8/1987 | Abeles et al. | 378/84 |
| 4,785,470 | 11/1988 | Wood et al. | 378/84 |
| 5,085,926 | 2/1992 | Iida et al. | 359/589 |

Primary Examiner—David P. Porta
Assistant Examiner—Don Wong
Attorney, Agent, or Firm—Shapiro and Shapiro

[57] ABSTRACT

For obtaining a high reflectivity, even when the thickness of periodic structure is reduced, in a multi-layered mirror consisting of alternate layers of a first substance showing a larger difference vacuum in the refractive index in the soft X-ray region and a second substance showing a smaller difference, a nickel-chromium alloy containing chromium in at least 5 wt. % is used as the first substance of larger difference. In a preferred form of the mirror, the second substance of smaller difference in refractive index is vanadium oxide.

16 Claims, 5 Drawing Sheets

MULTI-LAYERED MIRROR

BACKGROUND OF THE INVENTION

1. Field of the Invention

The present invention relates to a mirror composed of multi-layered film for use in a soft X-ray region, and more particularly a multi-layered mirror adapted for use in a soft X-ray microscope for organism observation.

2. Related Background Art

The refractive index of a substance in the X-ray region is represented by $n = 1 - \delta - ik$ wherein $\delta$ and $k$ are real numbers much smaller than unity (the imaginary part $ik$ represents the X-ray absorption). For this reason, lenses based on refractive action, as in the visible wavelength region, cannot be utilized in the X-ray region.

Consequently there is utilized a reflective optical system. However, since the reflectivity is very low at an incident angle smaller than the totally reflecting limit angle $\theta_c$ (about 5° or smaller for a wavelength of 25 Å), there is employed a multi-layered mirror having a plurality of (for example several hundred) reflecting planes formed by laminating layers of substances of a combination showing a high amplitude reflectivity at the interface and regulating the thicknesses of said layers in such a manner that the reflected waves mutually match in phase according to the optical interference theory.

More specifically, such multi-layered mirror can be obtained by alternately laminating a substance showing a larger difference in refractive index from vacuum (refractive index = 1) and another substance showing a smaller difference. There are conventionally known certain examples of combinations of such substances, such as W (tungsten)/C (carbon) and Mo (molybdenum)/Si (silicon), and such mirrors have been prepared by thin film forming technologies such as sputtering, vacuum evaporation, CVD etc.

The wavelength of X-ray employed for observation of living organism in a soft X-ray microscope is selected in a region called "water window" wherein proteins and water show a large difference in absorption coefficients as shown in FIG. 6, namely a region between the K absorption edge (23 Å) of oxygen and the K absorption edge (44 Å) of carbon. A wavelength of 25 Å, close to the absorption edge of oxygen showing a smaller absorption coefficient, is preferred in order to enable observation of a thicker specimen.

Also the periodic thickness d (combined thickness of a pair of said substance having a larger difference in refractive index from vacuum and said substance having a smaller difference), shown in FIG. 1, has to approximately satisfy the Bragg's law $2d \cdot \sin \theta = \lambda$, wherein $\lambda$ and $\theta$ are respectively the wavelength of X-ray and the angle between the mirror surface and the incident X-ray. The conventional multi-layered mirror has been designed to reflect the X-ray in said "water window" region by suitably selecting said periodic thickness and said angle of the incident X-ray to the mirror surface.

In a soft X-ray microscope or the like, the size of the multi-layered mirror can be made smaller and the freedom in the optical system design becomes larger, if the X-ray is made to enter the mirror as perpendicularly as possible. With such mode of entry, the microscope itself can be made more compact. Stated differently, said angle of the incident X-ray to the mirror surface should preferably be as large as possible.

However, as will be apparent from the foregoing Bragg's law, the periodic thickness has to be made smaller in order to introduce the X-ray, within the above-mentioned wavelength region, into the multi-layered mirror in a state as close to the perpendicular entry as possible. For example, the periodic thickness has to be 24 Å in order to introduce the X-ray of a wavelength of 33.7 Å with an angle of 45° to the multi-layered mirror. Thus, there has been a need for a multi-layered mirror having a high reflectivity and a reduced periodic thickness.

Nickel has a large difference from vacuum in refractive index in the above-mentioned wavelength region, and is therefore expected to provide a high reflectivity. In practice, however, in a multi-layered film employing nickel, it has been experimentally confirmed that the reflectivity rapidly drops when the thickness of nickel layers (or periodic thickness of the mirror) is reduced.

FIG. 3 shows the relationship between the periodic thickness and the ratio of measured reflectivity to calculated reflectivity when X-ray of a wavelength of 1.54 Å is reflected by a multi-layered film consisting of nickel/silicon oxide. Said multi-layered film provides a reflectivity corresponding to 80% of the calculated value at a periodical thickness of 60 Å, but rapidly loses the reflectivity with the reduction in the periodical thickness, and becomes totally incapable of reflection when the periodical thickness reaches 30 Å. Thus even the multi-layered film employing nickel loses reflectivity with the reduction in the periodical thickness, and is incapable of providing a high reflectivity in a state of a large angle of the incident X-ray to the mirror surface, in the aforementioned "water window" wavelength region.

SUMMARY OF THE INVENTION

The object of the present invention is to solve the above-mentioned problems.

The above-mentioned object can be attained, according to the present invention, by a multi-layered mirror consisting of alternately laminated layers of a substance showing a larger difference in refractive index in the soft X-ray region from vacuum (refractive index = 1) and another substance showing a smaller difference, wherein said substance of the larger difference in refractive index is composed of a nickel-chromium alloy containing chromium in 5 wt. % or larger, or pure chromium.

FIGS. 4A and 4B show the optical constants $\delta$, $k$ of nickel and chromium as a function of the wavelength of soft X-ray (20-50 Å). As will be apparent from these charts, nickel shows a larger difference in refractive index from vacuum, because of larger values of $\delta$ and $k$. Nickel is therefore anticipated to provide a higher reflectivity in this wavelength region. However, as explained above, the multi-layered film employing nickel shows a rapid decrease in reflectivity, when the periodic thickness of the multi-layered film is reduced.

FIG. 3 shows the relationship between the periodic thickness and the ratio of measured reflectivity to calculated reflectivity, for X-ray of a wavelength of 1.54 Å, in multi-layered films consisting of nickel/silicon oxide, nickel-chromium alloy (nickel 80 wt. %: chromium 20 wt. %)/silicon oxide, and chromium/silicon oxide. It will be understood that the deterioration in the reflectivity ratio, resulting with the reduction in the periodic thickness, can be significantly alleviated when nickel is replaced by nickel-chromium alloy or chromium.

For soft X-ray within the wavelength range of 20-50 Å, the optical constants of nickel-chromium alloy assume values between those of pure nickel and those of pure chromium, depending on the mixing ratio of nickel and chromium. More specifically, said optical constants become closer to those of pure nickel when the proportion of chromium is low, and those of pure chromium when said proportion is high. Consequently, in comparison with a multi-layered film employing pure chromium, that employing a nickel-chromium alloy can provide a higher reflectivity with a fewer number of layers.

FIG. 5 shows the reflectivity to soft X-ray of a wavelength of 33.7 Å, as a function of chromium content (in weight percent) in said alloy. The multi-layered film employed in this measurement was prepared by alternate laminations of 50 layers each of a nickel-chromium alloy with a thickness of 20 Å, and vanadium oxide with a thickness of 20 Å as a substance with a smaller difference in refractive index from vacuum. As will be apparent from FIG. 5, addition of chromium into nickel provides a higher reflectivity, in comparison with the case of pure nickel.

It is therefore possible to prevent the abrupt decrease in the ratio of reflectivity resulting from the reduction in the periodic thickness, by employing a nickel-chromium alloy or pure chromium, as the substance showing a large difference in refractive index from vacuum.

Also as will be understood from FIG. 5, the reflectivity can be made higher than in the case of pure chromium through the use of an alloy in which the content of chromium in nickel is 5 % or higher.

As explained in the foregoing, the present invention provides a multi-layered mirror which provides a high reflectivity even when the periodic thickness is reduced, by employing a nickel-chromium alloy or pure chromium as the substance showing a large difference in refractive index from vacuum.

It is therefore possible to construct an optical system in which the soft X-ray can be are perpendicularly introduced into said multi-layered mirror, and to thus increase the freedom of designing of the optical system.

It is also possible to reduce the dimension of the multi-layered mirror, thereby facilitating size and weight reduction of the equipment employing such multi-layered mirror.

The present invention is applicable not only in the soft X-ray microscope for observation of living organism but also to any optical equipment employed in the soft X-ray region, such as X-ray microscopes for other purposes, X-ray lithographic equipment, X-ray telescope, X-ray laser or the like.

DESCRIPTION OF THE PREFERRED EMBODIMENTS

Example 1]

Figure 1:
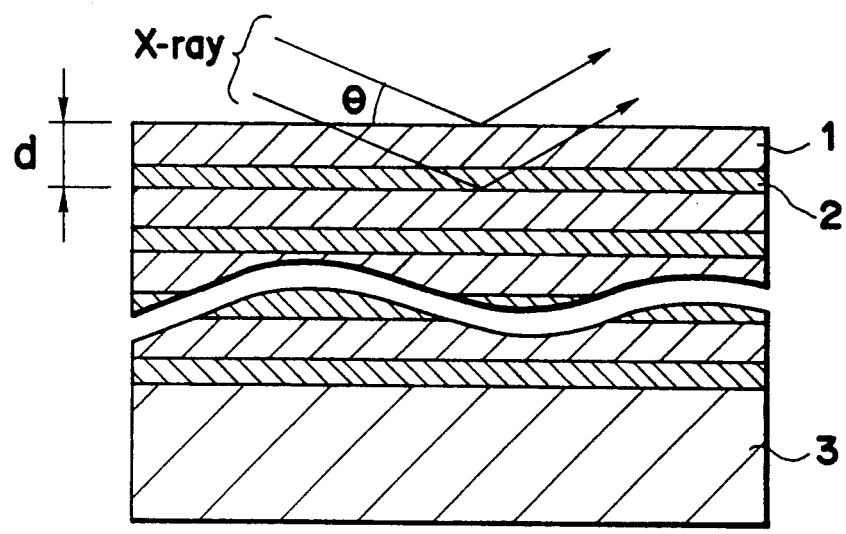
FIG. 1 is a cross-sectional view of a multi-layered mirror constituting a first embodiment of the present invention.

Multi-layered mirrors A were prepared, as shown in FIG. 1, by alternately laminating a nickel-chromium alloy 2 and vanadium oxide 1 by ion beam sputtering, with predetermined thicknesses (respectively a Å and b Å) and with 10 layers each (number of layers being reduced in the illustration) on a silicon wafer 3.

Similarly multi-layered mirrors B were prepared by alternately laminating chromium and vanadium oxide by ion beam sputtering, with predetermined thicknesses (respectively a Å and b Å) and with 10 layers each (number of layers being reduced in the illustration) on said wafer.

Also multi-layered mirrors C were prepared by alternately laminating nickel and vanadium oxide by ion beam sputtering, with predetermined thicknesses (respectively a Å and b Å) and with 10 layers each on said wafer.

Each of the above-mentioned multi-layered mirrors A to C was prepared with three different periodic thicknesses, 40, 50 and 60 Å. The thicknesses a, b of the layers constituting the multi-layered mirrors were selected as a half of the periodic thickness thereof (a=b=d/2 (Å)). For example, the layers were laminated with thicknesses of 20 Å each for a periodic thickness of 40 Å, and of 25 Å each for a periodic thickness of 50 Å.

The reflectivities of these multi layered mirrors A–C, measured with soft X-ray of a wavelength of 33.7 Å, are shown in Table 1.

The angle of the incident soft X-ray to the mirror surface was selected as about 25° for the periodic thickness of 40 Å, about 20° for the periodic thickness of 50 Å, and about 17° for the periodic thickness of 60 Å.

TABLE 1

| Periodic thickness (Å) | Multi-layered mirror A (Ni—Cr/V$_2$O$_5$) | | Multi-layered mirror B (Cr/V$_2$O$_5$) | | Multi-layered mirror C (Ni/V$_2$O$_5$) | |
| --- | --- | --- | --- | --- | --- | --- |
| | Calcd. | Measured | Calcd. | Measured | Calcd. | Measured |
| 40 | 20.0 | 10.8 | 17.2 | 12.0 | 20.7 | 7.0 |
| 50 | 22.1 | 13.7 | 18.9 | 13.2 | 22.9 | 13.5 |
| 60 | 23.1 | 15.7 | 19.7 | 13.7 | 23.9 | 18.6 |

As will be apparent from Table 1, the reflectivity is highest in the multi-layered mirror C (nickel/vanadium oxide) for the periodic thickness of 60 Å, but becomes higher in the multi-layered mirror A (nickel-chromium alloy/vanadium oxide) and B (chromium/vanadium oxide) as the periodic thickness becomes smaller to 40 and 50 Å.

Similar effects can be obtained when silicon oxide or carbon is employed, instead of vanadium oxide, as the substance showing smaller difference in refractive index from vacuum.

[EXAMPLE 2]

Figure 2:
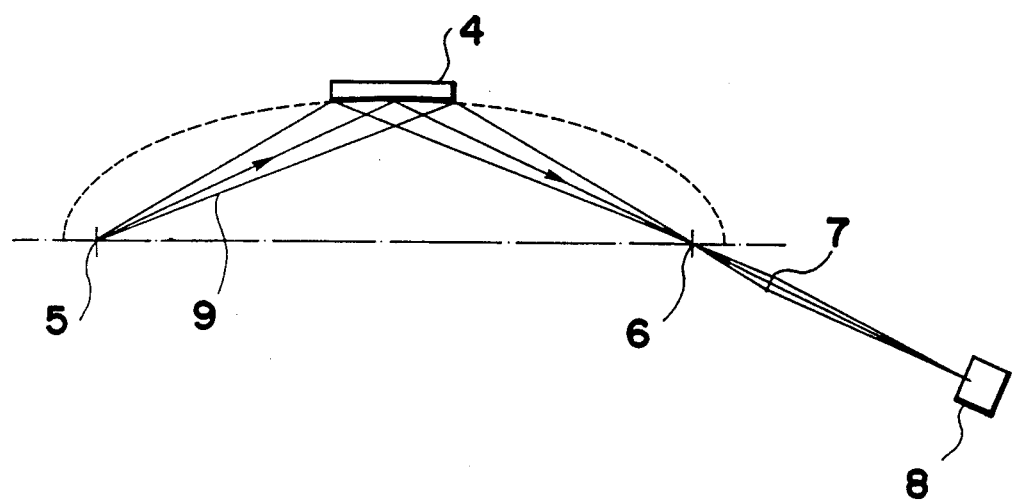
FIG. 2 is a schematic view of an X-ray microscope utilizing a multi-layered mirror.
Figure 3:
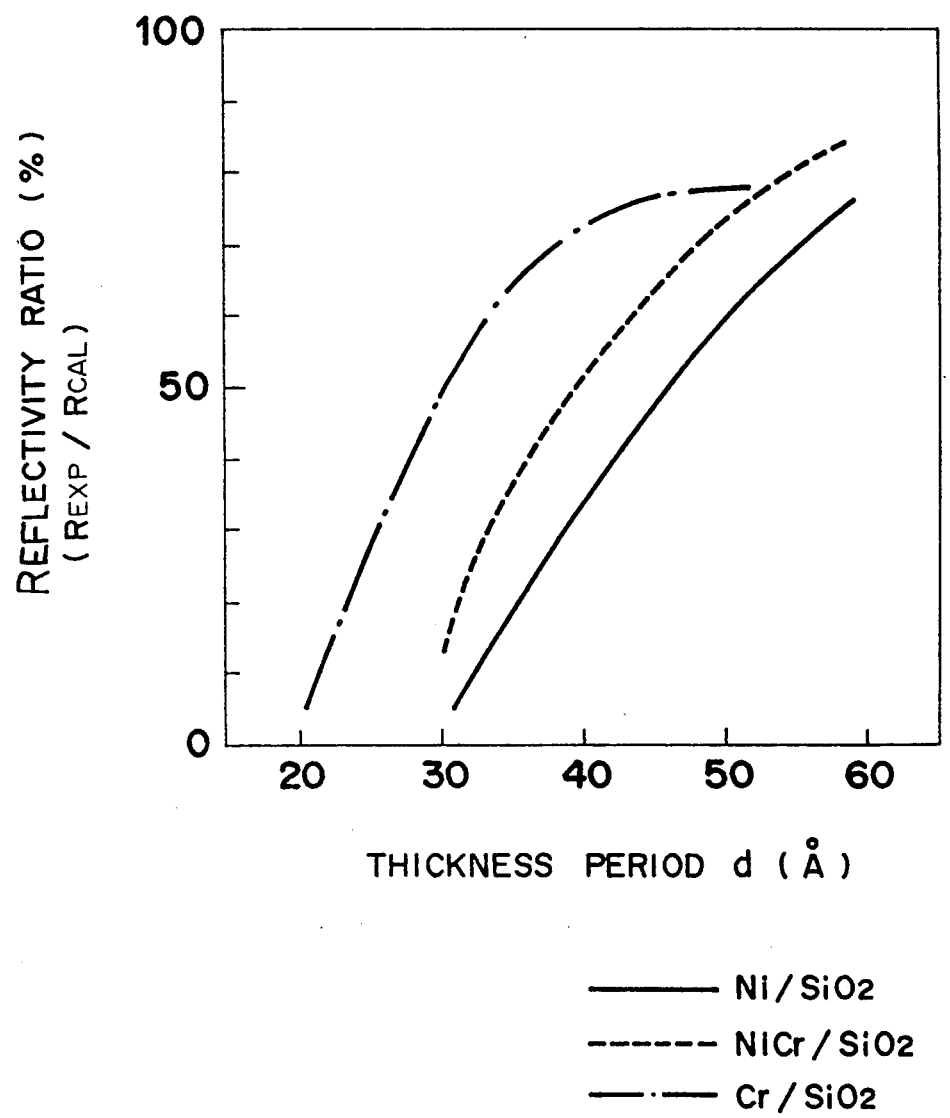
FIG. 3 is a chart showing the ratio of reflectivity for X-ray of a wavelength of 1.54 Å as a function of the periodic thickness, in multi-layered films composed of nickel/silicon oxide, nickel-chromium alloy/silicon oxide and chromium/silicon oxide.
Figure 4A:
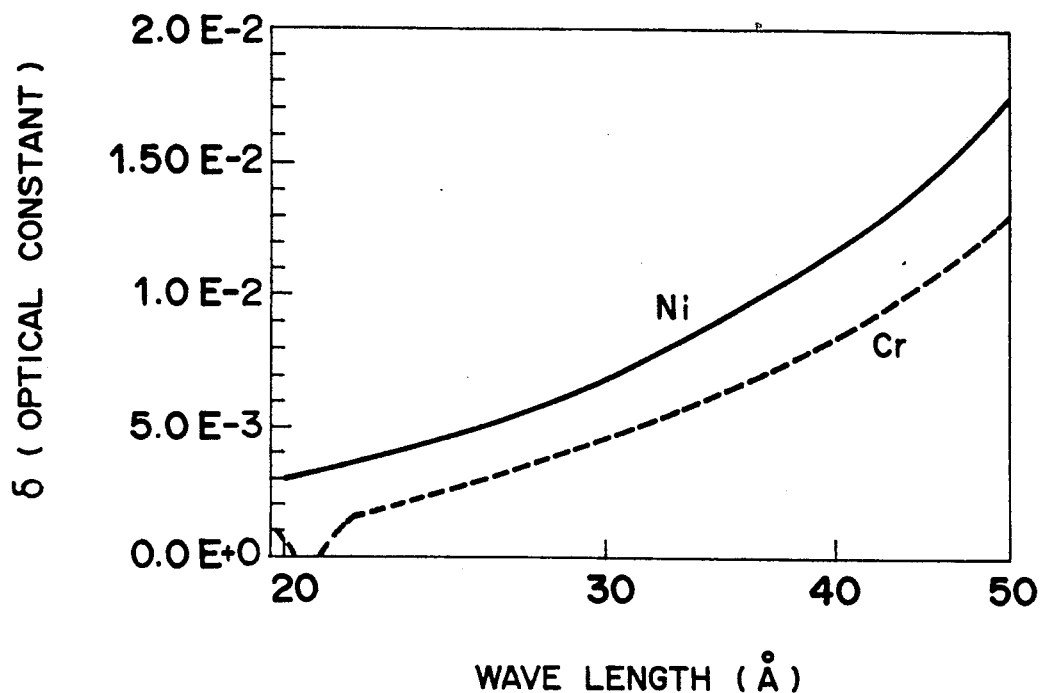
FIGS. 4A and 4B are charts showing optical constants $\delta$ and $k$ of nickel and chromium as a function of wavelength of soft X-ray in a range of 20 to 50 Å.
Figure 4B:
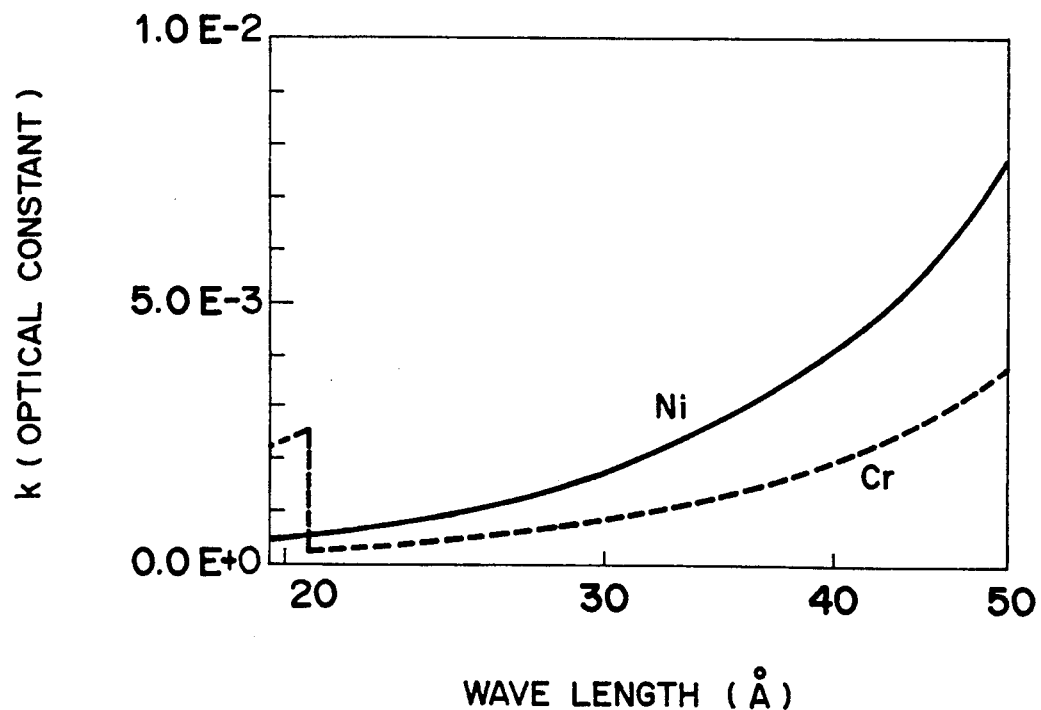
Figure 5:
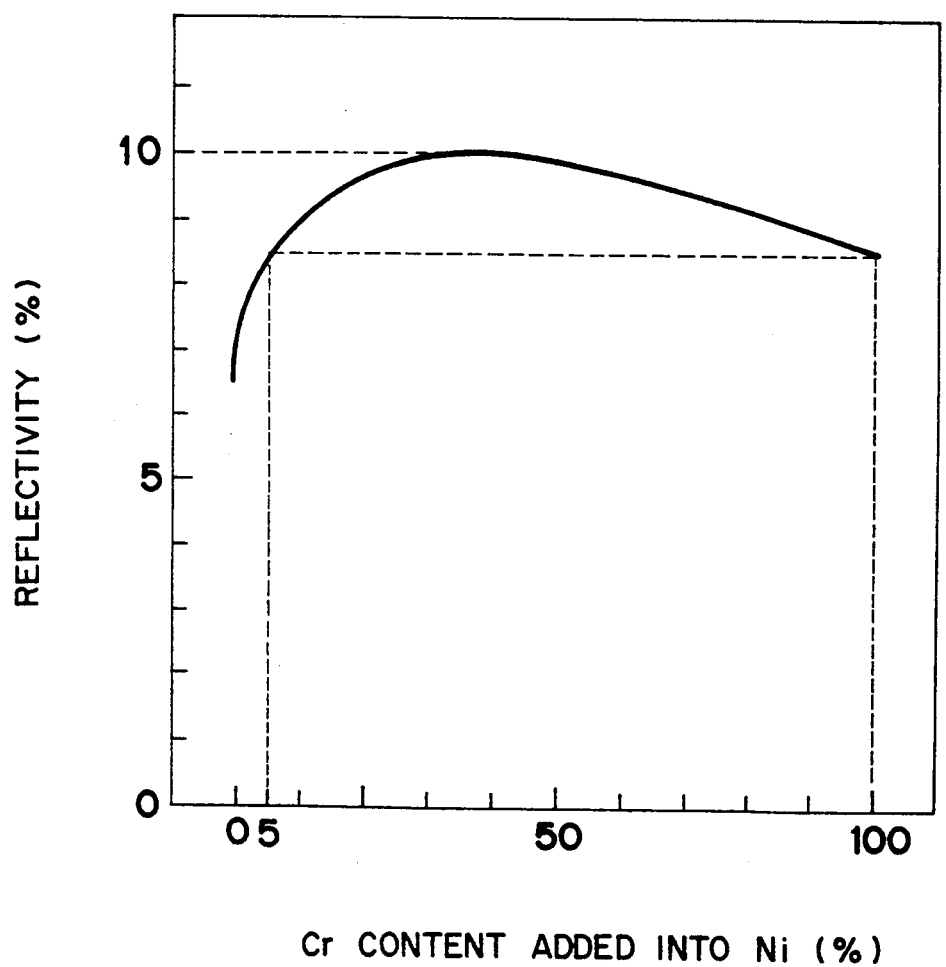
FIG. 5 is a chart showing the reflectivity as a function of chromium content in nickel.
Figure 6:
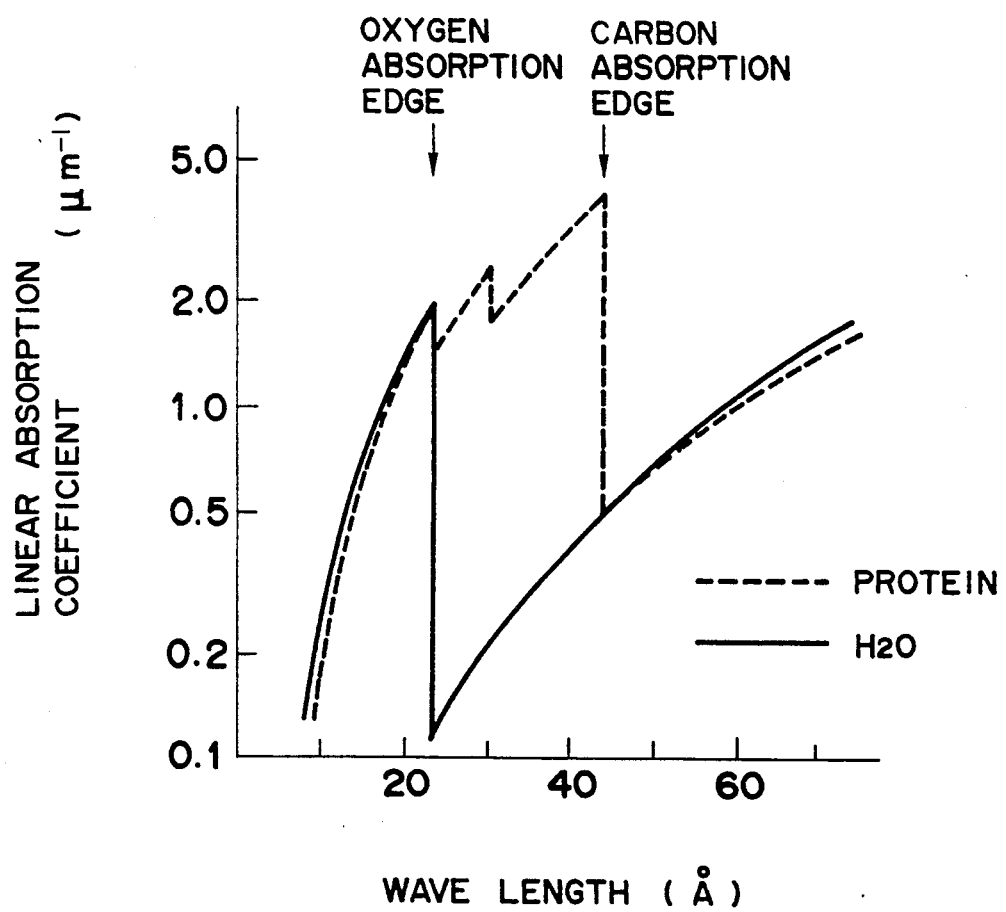
FIG. 6 is a chart showing the absorption coefficients of water and proteins in the soft X-ray region.

FIG. 2 is a schematic view of a soft X-ray microscope for organism observation, employing the multi-layered mirror of the present invention. A multi-layered condenser mirror 4 is formed as a part of an ellipsoid, and an X-ray source 5 and a specimen 6 are placed on the two focal points thereof. The x-ray source 5 provides soft X-ray of a wavelength of 33.7 Å. Also there are provided an imaging optical system 7 consisting of a zone plate for focusing the X-ray irradiating the specimen, and a detector 8 for detecting the X-ray irradiating the specimen.

In the above-explained microscope, the X-ray emitted from the X-ray source 5 is reflected by the multi-layered condenser mirror 4 and irradiates the specimen. After irradiating the specimen, the X-ray is focused onto the detector 8 by the imaging optical system 7 consisting of the zone plate.

The reflectivity of the multi-layered rotary elliptical mirror, employed in the soft X-ray microscope, was measured with soft X-ray of a wavelength of 33.7 Å.

The multi-layered condenser mirror was prepared by laminating a nickel-chromium alloy and vanadium oxide by ion beam sputtering on an ellipsoid substrate obtained by polishing glass.

The angle of the incident X-ray to the mirror surface was selected at 71°, at which a high reflectivity was anticipated for the multi-layered film consisting of combination of nickel-chromium alloy and vanadium oxide. The multi-layered film had 75 pairs of layers, with a periodic thickness of 54 Å at the mirror center. The uniformity of the periodic thickness was maintained within 2% over the entire mirror. The dimension of the mirror was selected as 100×39 mm, in consideration of the numerical aperture (=0.024) of the objective zone plate.

Such multi-layered condenser mirror showed a measured reflectivity of 14.3%.

A multi-layered film, consisting of combination of nickel/vanadium oxide and formed under the same conditions on the substrate of said form for the purpose of comparison, only showed a reflectivity of 12%.

[EXAMPLE 3]

In the microscope shown in example 2, a multi-layered film consisting of chromium/vanadium oxide was employed with an angle of the incident X-ray of 65° and subjected to the measurement of reflectivity as in the example 2.

Said multi-layered film was formed with 200 pairs of layers with a periodic thickness of 40 Å at the mirror center. The uniformity of the periodic thickness was maintained within 2% over the entire mirror. The size of the mirror was selected as 100×42 mm, in consideration of the numerical aperture (=0.024) of the objective zone plate.

The above-mentioned multi-layered condenser mirror showed a reflectivity of 10.5% for soft X-ray with a wavelength of 33.7 Å.

A similar multi-layered mirror, formed with nickel/vanadium oxide for the purpose of comparison, showed a reflectivity of only 6%.

What is claimed is:

1. A multi-layered mirror comprising:
   a substrate;
   first layers of a first substance; and
   second layers of a second substance;
   wherein said first layers and said second layers are alternately laminated on said substrate;
   the difference in refractive index in the soft X-ray region of said first substance from vacuum is larger than that of said second substance; and
   said first substance is a nickel-chromium alloy containing chromium in a proportion of 5% by weight or larger, or of pure chromium.

2. A multi-layered mirror according to claim 1, wherein said second substance is selected from the group consisting of vanadium oxide, silicon oxide and carbon.

3. An ellipsoidal multi-layered condenser mirror comprising:
   a substrate;
   first layers of a first substance; and
   second layers of a second substance; wherein said first layers and said second layers are alternately laminated on said substrate;
   the difference in refractive index in the soft X-ray region of said first substance from vacuum is larger than that of said second substance; and
   said first substance is a nickel-chromium alloy containing chromium in a proportion of 5% by weight or larger.

4. A multi-layered condenser mirror according to claim 3, wherein said second substance is selected from the group consisting of vanadium oxide, silicon oxide and carbon.

5. An X-ray microscope comprising:
   an ellipsoidal multi-layered condenser mirror including a substrate, first layers of a first substance, and second layers of a second substance, with said first layers and said second layers being alternately laminated on said substrate, the difference in refractive index in the soft X-ray region of said first substance from vacuum being larger than that of said second substance, and said first substance being a nickel-chromium alloy containing chromium in a proportion of 5% by weight or larger;
   an X-ray source and a specimen positioned respectively on two focal points of said condenser mirror;
   an imaging optical system capable of focusing X-rays; and
   a detector for detecting X-rays irradiating the specimen.

6. An X-ray microscope according to claim 5, wherein said second substance is selected from the group consisting of vanadium oxide, silicon oxide and carbon.

7. An X-ray microscope according to claim 6, wherein said imaging optical system includes a zone plate.

8. An X-ray microscope according to claim 5 wherein said imaging optical system includes a zone plate.

9. A multi-layered mirror comprising:
   a substrate;
   first layers of a first substance; and
   second layers of a second substance;
   wherein said first layers and said second layers are alternately laminated on said substrate;
   the difference in refractive index in the soft X-ray region of said first substance from vacuum is larger than that of said second substance; and
   said second substance is vanadium oxide.

10. A multi-layered mirror according to claim 9, wherein said first substance is chromium alloy.

11. An ellipsoidal multi-layered condenser mirror, comprising:
    a substrate;
    first layers of a first substance; and
    second layers of a second substance;

wherein said first layers and said second layers are alternatively laminated on said substrate;

the difference in refractive index in the soft X-ray region of said first substance from vacuum is larger than that of said second substance; and said second substance is vanadium oxide.

12. An ellipsoidal multi-layered condenser mirror according to claim 11, wherein said first substance is chromium alloy.

13. An X-ray microscope comprising:

an ellipsoidal multi-layered condenser mirror including a substrate, first layers of a first substance, sand second layers of a second substance, with said first layers and said second layers being alternately laminated on said substrate, the difference in refractive index in the soft X-ray region of said first substance from vacuum being larger than that of said second substance, and said second substance being vanadium oxide;

an X-ray source and a specimen positioned respectively on two focal points of said condenser mirror;

an imaging optical system capable of focusing X-rays; and a detector for detecting X-rays irradiating the specimen.

14. An X-ray microscope according to claim 13; wherein said first substance is chromium alloy.

15. An X-ray microscope according to claim 14, wherein said imaging optical system includes a zone plate.

16. An X-ray microscope according to claim 13, wherein said imaging optical system includes a zone plate.

* * * * *